Jan. 10, 1967 T. J. REINHART, JR 3,296,886
LAMINATED ROTARY STRUCTURES
Filed Jan. 12, 1965
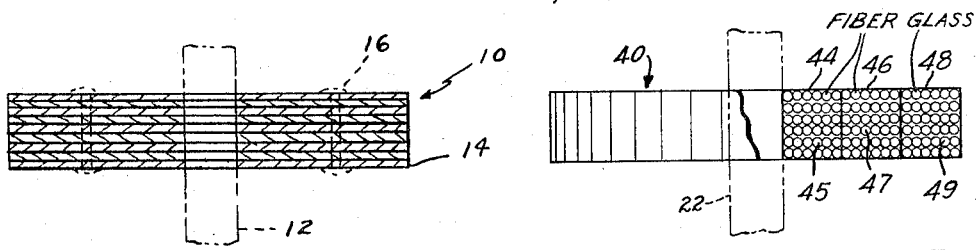
Fig-1
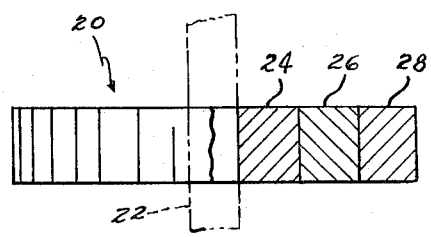
Fig-6
Fig-2
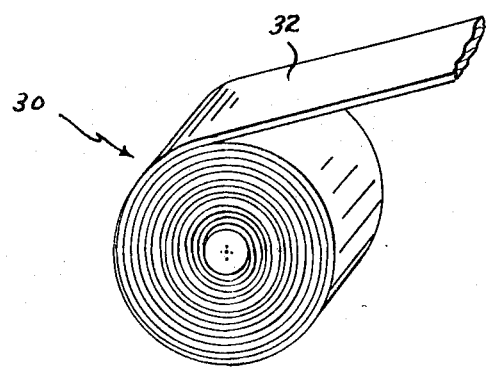
Fig-3
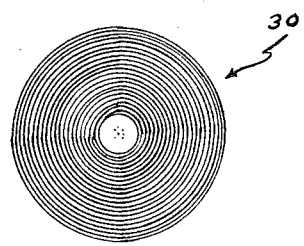
Fig-5
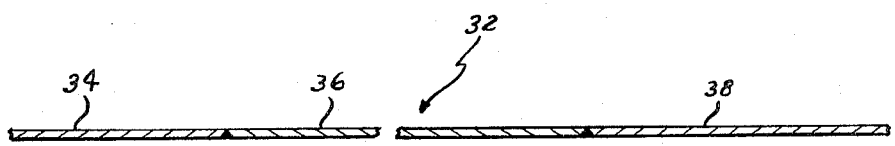
Fig-4
INVENTOR.
THEODORE J. REINHART, JR.
BY Harry A. Herbert Jr. and
Louis E. Day
ATTORNEYS

United States Patent Office 3,296,886
Patented Jan. 10, 1967

3,296,886
LAMINATED ROTARY STRUCTURES
Theodore J. Reinhart, Jr., 4116 Woodedge Drive,
Bellbrook, Ohio 45305
Filed Jan. 12, 1965, Ser. No. 425,098
6 Claims. (Cl. 74—572)

The invention described herein may be manufactured and used by or for the United States Government for governmental purposes without the payment to me of any royalty thereon.

This invention relates to high-speed balance rotary structures such as flywheels, and more specifically, to high-speed, high-energy structures which must be optimized for maximum output and safety at minimum size and weight. Examples of such rotary structures, in addition to flywheels, include turbine blade retaining disks in turbine engines, gyros and inertial power storage banks for use in satellites.

Although not limited to such use, and for purposes of illustration, the invention will be shown and described in simple balanced flywheel form; this form serving such purposes as easily as one of the more complex uses to which it is adaptable.

The advent of the space age has initiated the development and refinement of many devices which, for years, have been relatively stable. This has largely been brought about by the requirement for maximum output from minimum weight in order to conserve tare weight of the spacecraft. Various flywheel or rotary devices are used aboard spacecraft in the guidance and control systems and as energy banks which can be recharged between output peaks. Since such rotating bodies are inertial devices governed by the laws of kinetic energy, maximum performance is attained at maximum speed; the performance being quadrupled with a doubling of the speed. The speed, however, can not be increased beyond the bursting limit of the rotating body.

High-energy flywheels ideally require materials having high-specific gravity and high-bursting strength in order that a high-mass structure may be made to rotate at very high velocity. Such flywheels are usually made of steel because steel has favorable characteristics for such use. As a further refinement, such flywheels are usually made from forged billets or from tool steel which may be heat-treated and ground. Past flywheels made from such heat-treated materials were still short of their potential output because a relatively thick structure can not be heat-treated to a uniform condition throughout its cross section. As will be shown, all the embodiments of the present invention will permit higher rotative speeds with a resultant increase in output.

Two of the embodiments of this invention are particularly adapted to be built-up from the inside out of several materals having a progressive increase in the modulus of elasticity. This construction permits better stress distribution throughout the rotating body; and for a given output, a smaller mass may be rotated at a higher speed.

One of the embodiments may be filament wound from the inside out of several materials having a progressive increase in the modulus of elasticity. These materials may be nonmetallic such as various types of glass fiber, or the materials in a given structure may include both metallic and nonmetallic materials.

The primary object of this invention is to provide a rotary structure capable of higher rotative speeds for higher power output.

Another object of this invention is to provide a high-speed rotary structure of minimum mass for a given output.

A further object of this invention is to provide a laminated rotary structure in which each laminate may be heat-treated before assembly into the composite structure.

Yet another object of this invention is to provide a laminated rotary structure in which each laminate is sufficiently thin to minimize the variance in the condition of the heat treat in the central area when compared with surface areas.

A still further object of this invention is to provide a high-speed rotary structure made in a manner reducing failure during operation to a minimum by permitting more thorough inspection of the elements of the structure.

And yet another object of this invention is to provide a high-speed rotary structure which may be built-up from the inside out of several materials having a progressive increase in the modulus of elasticity.

Additional objects, advantages and features of the invention reside in the construction, arrangement, and combination of parts involved in the embodiments of the invention as will appear from the following description and accompanying drawing, wherein:

FIG. 1 is a first embodiment of the invention in which a plurality of disk elements are juxtapositioned on the axis of rotation;

FIG. 2 is a second embodiment of the invention in quarter-section and showing a plurality of concentric ring elements joined for rotation about the axis of rotation;

FIG. 3 is a perspective depicting the manner of forming the third embodiment of the invention by helically winding an elongated metallic strip;

FIG. 4 depicts the manner of forming the metallic strip of the third embodiment from a plurality of different strips, each having a different modulus of elasticity;

FIG. 5 is an end view of a flywheel made in the manner shown in FIG. 3; and,

FIG. 6 is a quarter-section of a variation of the embodiment shown by FIG. 2.

The first embodiment of the invention, depicted by FIG. 1, consists of flywheel 10 which is apertured for joining to any shaft, such as shaft 12, which does not constitute a portion of this invention. The flywheel has, for its principal elements, a plurality of thin wafer-like centrally pierced plano-disks 14 which are laterally stacked for rotation about the axis of shaft 12. Dependent on such criteria as size and velocity of the flywheel, as well as materials, each disk may vary in thickness from about the thickness of a razor blade to about one-eighth of an inch. As with razor blades, each disk may be made of high-grade steel which is capable of being heat-treated to a high-tensile strength without developing flaws. Very thin materials, as is well known, can be heat treated to have extremely uniform characteristics throughout their cross sections as opposed to areas of high-stress concentrations in thick materials. After the disks have been heat treated, each individual disk may be X-rayed and otherwise inspected to assure that only acceptable disks enter the final structure.

A plurality of disks may be formed into a flywheel by several methods. The first and preferred method is by bonding with adhesives or brazing metals. When adhesives are used, the type of adhesive is largely determined by the ambient temperature in which the flywheel is to function. Organic thermal-setting adhesives are preferred at temperatures below 600° F. Inorganic thermal-setting adhesives are preferred at temperatures above 600° F. An example of a satisfactory organic adhesive is the epoxy phenolic adhesive HT424 manufactured by the Bloomingdale Rubber Company of Aberdeen, Maryland. An example of a satisfactory inorganic adhesive is the aluminum phosphate binder manufactured by the Brunswick Corporation of Marion, Virginia. Regardless of whether the disks are to be formed into a flywheel by bonding with thermo-setting adhesive or by brazing, the procedure is the same. The bonding material is sandwiched between the disks, and compressive pressure is applied to the structure while it is being heated to proper temperature within a furnace.

The second method of joining the disks into a flywheel consists of holding the stacked disks together by means of lateral fasteners, such as rivets 16, which pass through pierced holes in the disks. Regardless of the type of fasteners used, they should be circumferentially spaced on a common hole circle for static and dynamic balance.

The second embodiment of the invention, depicted by FIG. 2, consists of a flywheel 20 having a plurality of laminated rings concentric about the axis of rotation of shaft 22 to which the inner ring of the structure may be joined in any conventional manner. Although two or more concentric rings may be used within the scope of this invention, three rings are shown in the flywheel of FIG. 2; an inner ring 24, an intermediate ring 26, and an outer ring 28. The individual rings may be either metallic or non-metallic. The primary advantage of this laminated embodiment over a conventional monostructure flywheel is that it will permit the same level of output with a lighter flywheel rotating at a higher peripheral velocity. This is achieved by a more uniform stress distribution throughout the laminated flywheel.

The radial and tangential stresses in a solid monolithic flywheel are greater at the inner radii of the structure and drop to minimums at the outer radii. This necessitates that the rotating structure be limited to speeds which will not overstress the material at the inner radii.

An analysis of the stresses in a rotating flywheel is best made by taking a radial section thereof and treating it as a moment arm revolving about the axis of rotation. Such a section has tangential forces which are circumferentially resisted by the flywheel structure, and radially outward forces tending to make the flywheel grow and which are radially resisted by the flywheel structure. The outer portion will be under the greatest force and will tend to grow the greatest amount. In a monolithic wheel, the force applied at the periphery tends to separate the structure, and the stress is transmitted toward the center of the wheel. Since the stress-absorbing, cross-sectional area decreases as the radius decreases, there is a progressively diminishing cross-sectional area of material to absorb the load, and, therefore, the inner portions of the wheel will be more highly stressed than the outer portions. Therefore, the load (or speed) of the wheel is limited by the yield of that portion nearest the hub of the wheel.

In the structure shown on FIG. 2, the concentric rings from the inside out are of nonresilient materials having a progressively higher modulus of elasticity, and are bonded or brazed together by manners well known to the art. As the outer ring is loaded and grows under the applied forces, the inner rings must follow; otherwise there would be a wheel failure. However, as an antithesis of the monolithic wheel previously discussed, the inner rings having a lower modulus of elasticity, will grow the required amount under less applied stress. It is thus seen that the inner rings can tolerate more radial growth without failure. The practical effect is that the outer ring will restrain the stress growth of the inner rings, while it itself may be rotated at speeds more commensurate with its yield point. This is not only true of the outer ring in relation to the intermediate and the inner ring, but it is also true of the intermediate ring in relation to the inner ring.

Wide latitude may be exercised in the selection of materials and in the thickness of the various rings comprising the flywheel. The ideal situation is one in which the respective rings are stressed to a uniform gradient. The structures may be metallic or nonmetallic. Nonmetallic wheels are preferably laminate wound in thermo-setting epoxy resins from that group of filament material known as fiber glass. FIG. 6 depicts a typical nonmetallic laminate-wound flywheel 40 supported on shaft 22. Although two or more concentric rings may be used within the scope of the invention, three rings are shown; an inner ring 44 wound of yarn 45, an intermediate ring 46 wound of yarn 47, and an outer ring 48 wound of yarn 49. The three yarns, from the inside out, are selected to have an increasing modulus of elasticity; that is, each ring from the inside out is wound of a yarn having higher modulus of elasticity than that of the yarn forming the preceding ring. Each ring is progressively wound in circumferential laminate fashion much as thread is wound onto a spool. The yarn is set in thermo-setting resin by methods well known to the art. One such method is to automatically run the yarn through a liquid resin bath before it is wound onto the ring.

Typical metals from which the rotary structures could be built, from the inside out, are:

|  | P.s.i. modulus of elasticity |
|---|---|
| Titanium | $17 \times 10^6$ |
| Steel | $30 \times 10^6$ |
| Molybdenum | $50 \times 10^6$ |

Typical fiber glass from which the rotary structures could be built, from the inside out, are:

|  | P.s.i. modulus of elasticity |
|---|---|
| E glass fiber | $10.5 \times 10^6$ |
| S994 glass fiber | $12.5 \times 10^6$ |
| YM31A glass fiber | $15.5 \times 10^6$ |

In addition to structures which are either all metallic or all nonmetallic, combination structures may be built. For example: a laminated structure built of fiber glass yarn having the above specification could be further built up by laminating with fine wire in the following order:

|  | P.s.i. modulus of elasticity |
|---|---|
| Steel wire | $30 \times 10^6$ |
| Titanium wire | $17 \times 10^6$ |

The fiber glass structures will be found to be particularly beneficial, because of all the ordinary materials, reinforced plastics have the most favorable strength-to-weight ratio. Filament wound fiber glass reinforced plastics develop strength-to-weight ratios in excess of any known structural material.

The third embodiment of the invention depicted by FIG. 3 and FIG. 5 consists of a rotary structure, such as flywheel 30, in which a material in strip form, such as strip 32, is helically wound about the axis of rotation, as shown on FIG. 3, to form a laminated structure which is bonded or brazed in a manner well known to the art. The structure so formed may be made of a continuous strip having the same composition; in which case it will have the advantages pointed out for the first embodiment of the invention. The preferred structure of the strip, however, is shown on FIG. 4. Strip 32 is shown as comprising three portions 34, 36, and 38, which are united at abutting ends into a single strip by brazing or by other means. The portions may be of the above-mentioned metals in the order named (titanium, steel, and molybdenum) in which case the strip is wound to place the titanium portion at the inside of the structure. This structure provides the advantages of the second embodiment of the invention, in that the structure has a plurality of metals, each from the inside out having a progressively higher modulus of elasticity.

All the embodiments of this invention may be statically and dynamically balanced by means well known to the art, and not constituting a portion of this invention.

It is to be understood that the embodiments of the present invention as shown and described are to be regarded as illustrative only, and that the invention is susceptible to variations, modifications, and changes within the scope of the appended claims.

I claim:
1. A balanced rotary structure rotatable about an axis of rotation therethrough and comprising: a plurality of nonresilient radially laminated rings concentric about the axis of rotation and bonded together on all common mating surfaces into a unitary structure, each of said rings from the inside outward being of a material having a higher modulus of elasticity than the preceding ring.

2. A balanced rotary structure rotatable about an axis of rotation therethrough and comprising: a plurality of radially laminated rings concentric about the axis of rotation and bonded together on all common mating surfaces into a unitary structure, each of said rings from the inside outward being of a solid metal having a higher modulus of elasticity than the preceding ring.

3. A balanced rotary structure rotatable about an axis of rotation therethrough and comprising: a plurality of radially laminated rings concentric about the axis of rotation and bonded together on all common mating surfaces into a unitary structure, each of said rings being filament-wound of a nonmetallic yarn set in a thermo-setting resin and each of said rings from the inside outward being of a yarn having a higher modulus of elasticity than the yarn in the preceding ring.

4. A balanced rotary structure rotatable about an axis of rotation therethrough and comprising: a plurality of radially laminated rings concentric about the axis of rotation and bonded together on all common mating surfaces into a unitary structure, each of said rings being filament-wound of metallic wire set in a thermo-setting resin and each of said rings from the inside outward being of a wire having a higher modulus of elasticity than the wire in the preceding ring.

5. A balanced rotary structure rotatable about an axis of rotation therethrough and comprising: a plurality of radially laminated rings concentric about the axis of rotation and bonded together on all common mating surfaces into a unitary structure, each of said rings being of filament-wound material set in thermo-setting resin with at least the inner ring being on non-metallic yarn and the balance of the rings of metallic wire and with the filament material of each ring from the inside outward having a higher modulus of elasticity than the filament material in the preceding ring.

6. A balanced rotary structure rotatable about an axis of rotation therethrough and comprising: an elongated flat strip comprising a plurality of end-welded sections each having a progressively higher modulus of elasticity than the preceding section and helically wound about the axis of rotation to be radially laminated with the section having the highest modulus of elasticity at the outside, each lamination being bonded to the adjacent laminations into a unitary structure.

References Cited by the Examiner

UNITED STATES PATENTS

| | | | |
|---|---|---|---|
| 860,336 | 7/1907 | Schultz | 74—572 |
| 2,005,974 | 6/1935 | Hutchison | 74—574 X |
| 2,412,576 | 12/1946 | Giles | 217—76 |
| 3,015,597 | 1/1962 | Lambert | 206—59 |

FOREIGN PATENTS

| | | |
|---|---|---|
| 466,401 | 10/1928 | Germany. |
| 18,888 | 9/1904 | Great Britain. |

FRED C. MATTERN, JR., *Primary Examiner.*

W. S. RATLIFF, *Assistant Examiner.*